April 17, 1951 E. F. SPERLING 2,549,341
PAN SPACER
Filed Dec. 22, 1947 3 Sheets-Sheet 3
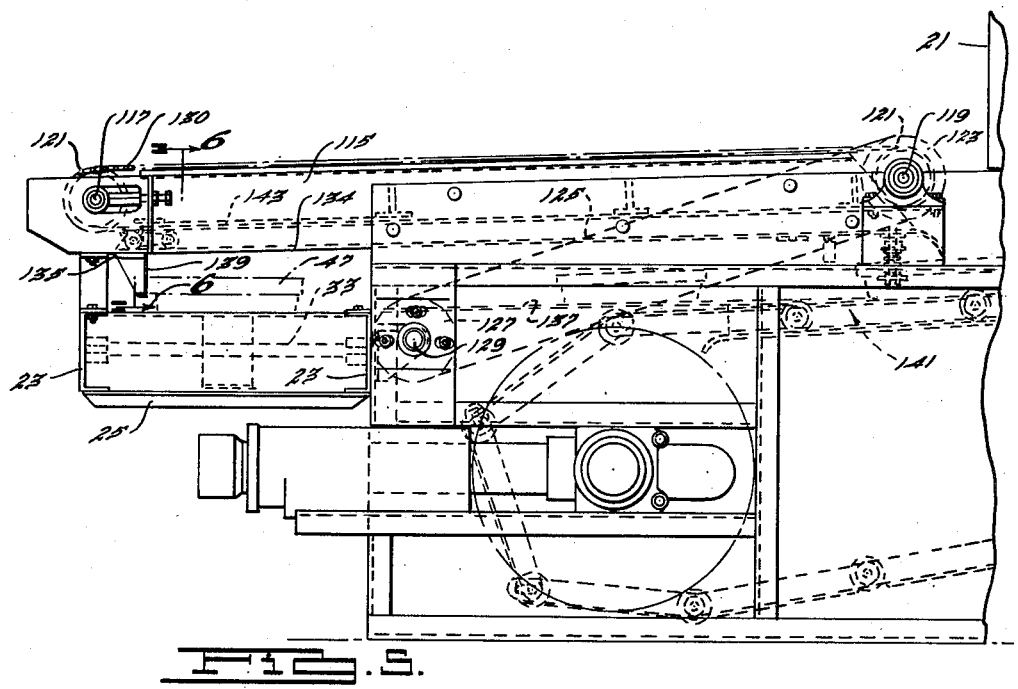
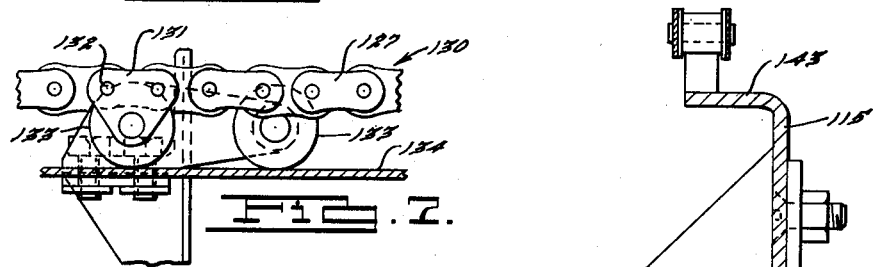
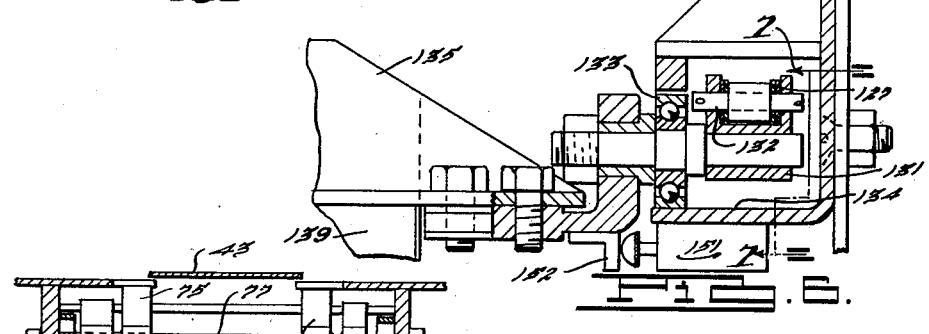
INVENTOR.
Ezra F. Sperling.
BY
Harness, Dickey & Pierce
ATTORNEYS.

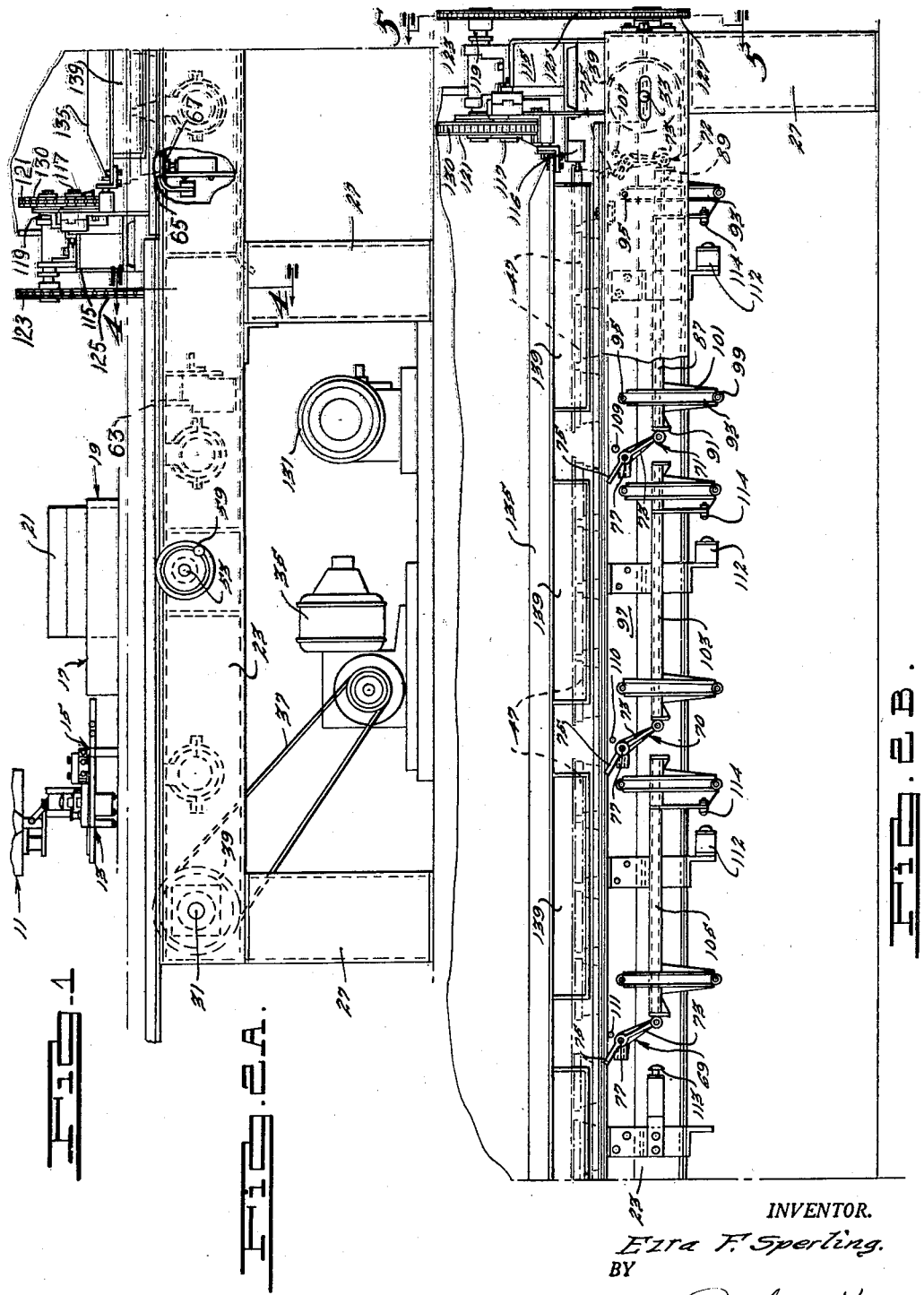

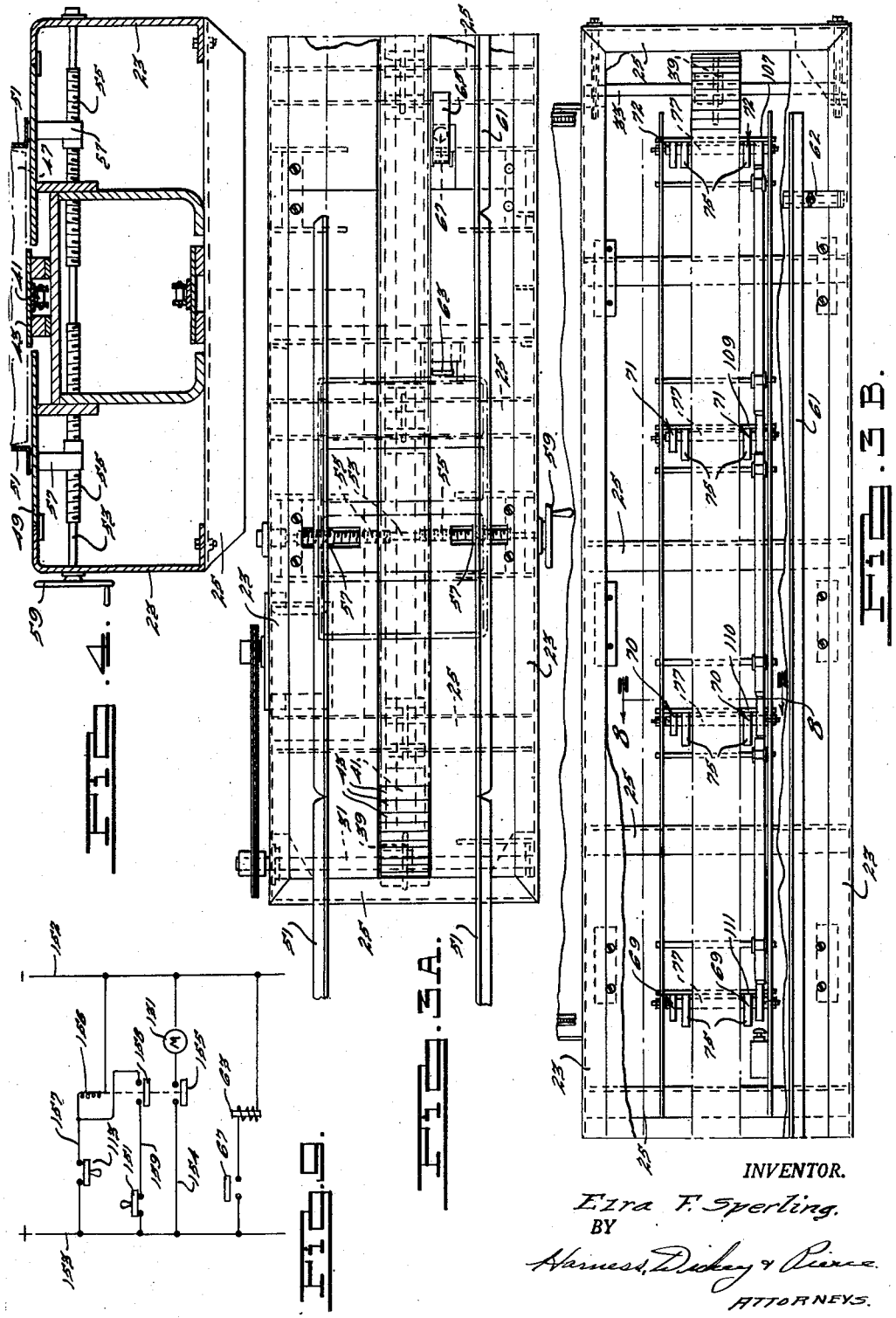

Patented Apr. 17, 1951

2,549,341

UNITED STATES PATENT OFFICE 2,549,341

PAN SPACER

Ezra F. Sperling, Los Angeles, Calif., assignor to Baker Perkins, Inc., Saginaw, Mich., a corporation of New York Application December 22, 1947, Serial No. 793,249

8 Claims. (Cl. 198—34)

1

This invention relates to an article feeding and spacing mechanism, and more particularly to such a mechanism, for use in a commercial baking system, which automatically feeds and spaces a predetermined number of pans of dough in front of a mechanism for pushing or moving the pans into an oven or proofer.

In the commercial baking of loaves of bread, for example, the bread dough, after certain preliminary mixing, proofing and forming operations, is disposed in a plurality of pans which are conveyed through a final proofer or a baking oven. The present invention concerns a feeding and spacing mechanism which automatically feeds and spaces a predetermined number of pans into an oven or a proofer at definite intervals so that jamming and crowding of the pans are eliminated.

Heretofore it has been the practice to provide operators whose duty it was to place pans of dough on the feed apron of a final proofer ahead of a pushing device for conveying the pans into the oven or proofer. This has resulted in higher costs and a somewhat unsatisfactory operation, because of the extra operators necessary to place the pans on the final feed apron and due to the fact that, as the pushing device moved forward in a definite fixed timed cycle to place the pans in the proofer or oven, it was not always possible for the operator to place the required number of pans on the feed apron ahead of the pushing device because of unforeseen delays or improper spacing of the pans on the feeding conveyer or other means of delivery to the proofer or oven. Consequently, the maximum capacity of the proofer was not always utilized and less than the required number of pans of dough were delivered to the oven or proofer. Furthermore, there is always the possibility of the operator placing the pans improperly in front of the pushing device, causing jamming and breakage of the pans and equipment as well as injury to the operator when he attempted to correct the misalignment.

It is, therefore, an object of this invention to provide automatic means for feeding the pans of dough onto the final feed apron in properly spaced relationship, so that the correct number of pans will be conveyed into the proofer or oven without danger of any jamming, breaking or misalignment of the pans.

It is a further object of this invention to provide, in a mechanism of the aforementioned type, means for causing the device for pushing the pans along the feed apron to so operate that the device will only operate to push the pans of dough when the properly spaced number of pans is disposed in front of the same.

It is a still further object of this invention to provide improved means for spacing the pans in a predetermined relationship along the conveyer so that the same will be disposed in front of the pushing device in the proper relationship.

It is a still further object of this invention to provide a mechanism of the aforementioned type which is completely automatic in operation, rugged in construction, and comparatively inexpensive to operate and maintain.

These and other objects of this invention will become apparent from the following detailed description taken in conjunction with the accompanying drawings, in which:

Figure 1 is a view illustrating diagrammatically a portion of a commercial baking system incorporating the feeding and spacing mechanism of this invention;

Figures 2A and 2B, when placed end to end, are a side elevational view of the feeding and spacing mechanism of this invention and a portion of a device for removing pans of dough from the feeding and spacing mechanism and feeding the same into a final proofer or oven;

Figures 3A and 3B, when placed end to end, are a top plan view of the structure illustrated in Figures 2A and 2B;

Figure 4 is an enlarged sectional view of the structure illustrated in Figure 2A, taken along the line 4—4 thereof;

Figure 5 is an end elevational view of one type of a pusher mechanism and feed apron which may be employed with the feeding and spacing mechanism of this invention, taken along the line 5—5 of Figure 2B;

Figure 6 is an enlarged sectional view of the structure illustrated in Figure 5, taken along the line 6—6 thereof;

Figure 7 is a sectional view of the structure illustrated in Figure 6, taken along the line 7—7 thereof;

Figure 8 is an enlarged sectional view of the structure illustrated in Figure 3B, taken along the line 8—8 thereof; and Figure 9 is a wiring diagram of the electrical control apparatus.

This invention contemplates the use of a feeding and spacing mechanism in a commercial bread baking system which employs, as can be seen in Figure 1, a conventional proofer discharge 11, a dough molding machine 13, and a panning machine 15. This invention particularly relates to two sections of the conveying mechanism of the baking system: namely, a supply section 17, which receives pans of dough from the panning machine 15, and a spacing section 19 connected to and disposed rearwardly of the supply section. The spacing section 19 is disposed ahead of the front end of the feed apron of a final proofer 21 and delivers the pans of dough to the latter. The supply section 17 delivers pans, one at a time, to the spacing section 19, and the latter holds a definite number of properly spaced pans until it is full and then starts a pusher bar device which delivers the pans onto the feed apron of the final proofer 21 in a manner which will be brought out below.

The conveyer supply and spacing sections 17 and 19 comprise spaced-apart longitudinal side members 23 and spaced transverse supporting members 25 which form a conveyer frame which is supported on suitable legs 27, as can be seen in Figures 2A and 2B. A transversely extending shaft 31 is journaled in the frame side members 23 adjacent the forward end of the supply section 17, and a like shaft 33 is journaled in the frame side members adjacent the rear end of the spacing section 19. The shaft 31 is power-driven by a motor 35 and appropriate chain drive means 37. Chain sprockets 39 are keyed to the shafts 31 and 33 at substantially the mid-point of the latter, and a single strand of conveyer chain 41 is trained around the sprockets 39 so as to be drivingly connected thereto. A plurality of longitudinally spaced plates 43 is connected to the conveyer chain 41 so as to be carried by the latter substantially the length of the conveyer frame and around the chain sprockets 39 at each end of the frame.

The front end of the conveyer supply section 17 is so associated with the panning machine 15 that the conveyer chain plates 43 will convey a plurality of pans 47 from the machine 15 and into the supply section. The pans 47 may be separated into single components or into component groups of interconnected pans. By way of illustration, the pans are shown (Figure 2B) as separated into groups of four pans interconnected by suitable strap means or the like, so as to provide a plurality of pan groups. Hereinafter, in referring to a pan, it will be understood that a single pan or a pan group is being referred to.

As can be seen in Figure 4, the conveyer plates 43 are of a lesser width than the pans 47, so as to frictionally engage only the center portion of the underside of the pans. In this way, the pans are carried by the frictional engagement with the plates and when a pan is stopped, in a manner which will be hereinafter brought out, the chain conveyer and plates 43 may slide along the bottoms of the pans, thereby permitting the pans to be held in a stopped position while the conveyer chain and plates continue to move. As the plates 43 support only the center portion of the pans, supporting plates 49 are provided on each side of the conveyer chain 41 and connected to the conveyer frame for supporting the outer portions of the pans by engaging the bottom outer portions thereof with a minimum of friction, so as not to hinder the normal movement of the pans by the frictional engagement with the more elevated conveyer plates 43.

In order to maintain the pans 47 centrally with respect to the conveyer chain and plates 43, a pair of opposed longitudinally extending guide rails 51 is provided. The guide rails 51 are transversely adjustable with respect to the conveyer frame, so as to properly guide various widths of pans employed. In order to adjust the transverse position of the guide rails 51, a transversely extending shaft 53 is rotatably journaled in the opposed side members 23 of the frame and is provided adjacent each end thereof with right- and left-hand threaded portions 55. The threaded shaft portions 55 threadably engage internally threaded bosses 57 secured to the underside of the guide rails 51. A hand wheel 59 is secured to one end of the shaft 53 outwardly of one frame member 23 for rotating the shaft and opening or closing the guide rails 51 in accordance with the width of the pans. The guide rails 51 extend rearwardly through the supply section 17 and terminate adjacent the front end of the spacing section 19. A single guide rail 61 extends rearwardly from one of the guide rails 51 in the spacing section 19. The single guide rail 61 is on the opposite side of the conveyer chain 41 from the final proofer 21, so as to permit the pans to be moved toward the final proofer, as will hereinafter appear. The rear end of the single guide rail 61 is adjustably secured to one of the conveyer frame members 23 at 62, and the other end thereof is connected to the outer guide rail 51, so that the single guide rail is moved when the guide rails 51 are adjusted to accommodate various sized pans.

A solenoid operated arresting finger 63 is disposed adjacent the delivery end of the conveyer supply section 17. The finger 63 is normally disposed with the upper end thereof below the carrying surfaces of the conveyer plates 43, so as not to interfere with the movement of the pans 47 on the conveyer. Rearwardly of the front or entrance end of the conveyer spacing section 19 is a hinged plate or finger 65, which rests upon a spring-pressed normally open electrical contact 67. The contact 67 normally maintains the hinged plate 65 above the carrying surfaces of the conveyer plates 43 and controls a circuit through the solenoid-operated arresting finger 63, so that when the plate 65 is in its normal up position, the upper end of the arresting finger 63 will be disposed below the carrying surfaces of the conveyer. When a pan passes over the hinged plate 65, the latter is depressed and closes the contact 67, so as to close the circuit and energize the solenoid so as to raise the arresting finger 63 above the conveyer plates and hold back oncoming pans which are being carried by the conveyer chain and plates along the supply section 17. If the arresting finger 63 should be raised while one of the pans is over the same, the weight of the pan will hold the arresting finger down until the pan passes beyond the arresting finger, whereupon the latter will be raised due to its solenoid to engage the next pan. For example, if a group of pans is strapped together, as mentioned above, and one of the pans of the group should be disposed over the arresting finger when the hinged plate 65 is depressed, as soon as that pan of the group passes over the finger 63 the finger will raise and engage the following pan of the group, and thus hold back the group of pans and prevent the same from entering into the spacing section 19 until the previous group of pans has passed over the hinged plate 65 and permitted the same to rise, so as to break the circuit to the arresting finger 63 and cause the latter to be depressed. The distance between the hinged plate 65 and the arresting finger 63 is a calculated predetermined distance, depending upon various factors which will hereinafter appear.

A plurality of longitudinally spaced opposed pairs of detents or stop devices, indicated generally at 69, 70, 71 and 72, is provided in the spacing section 19 for spacing the pans which are carried into the spacing section by the conveyer. Each of the stop devices includes a pair of stop arms 73 and an actuating arm 75, all secured to a transversely extending shaft 77, as best shown in Figure 8. Each of the shafts 77 is pivotally connected at its opposite end to a supporting plate 79 carried by the conveyer frame. The opposed pairs of stop arms 75 carried by each shaft 77 are adapted to engage the front face of one of the pans 47 when the latter reaches a predetermined position in the spacer section, as will be hereinafter brought out. The arms 73 and 75 of each stop device (Figure 8) are spaced about 150° apart, with the stop arm 75 extending upwardly and the actuating arm 73 extending downwardly.

While any desired number of stop devices may be provided, four sets of stop devices are provided in the mechanism shown in the drawings and the devices are consecutively numbered, from the entrance end of the spacing section rearwardly, as 69, 70, 71 and 72. Each of the stop arms on the stop device 72 adjacent the rear end of the spacing section 19 is so proportioned that it will normally hang with its arm 75 extending upwardly above the carrying surface of the conveyer plates 43 at an angle of approximately 30° to the vertical, and with its lower arm 73 extending substantially vertically below the shaft 77. The other stop devices 69, 70 and 71 are so counterbalanced that they normally hang with their upper arms 75 at substantially a 60° angle, so that the upper ends thereof are below the carrying surface of the conveyer plates 43 and permit the pans 47 to pass thereover, while the arms 73 incline at an angle of about 30° to the vertical, as shown in Figure 2B.

Extending between stop devices 72 and 71 is a tubular element 87 having an end plate 89 on the rear end thereof and an end plate 91 on the forward end thereof. Each tubular element 87 is mounted for horizontal reciprocation with respect to the conveyer frame by means of vertically extending links 93. The upper end of each link 93 is pivotally connected at 95 to a plate or supporting member 97, which is carried by the conveyer frame. The lower end of each link 93 is pivotally connected at 99 to a depending lug 101, which, in turn, is fixedly connected at its upper end to the tubular member 87. A similar pair of tubular elements 103 is mounted on each plate 97 for horizontal reciprocation between the pairs of stop devices 70 and 71, and a similar pair of horizontal reciprocable tubular elements 105 is connected to each of the plates 97 between the pairs of stop devices 69 and 70. It will, of course, be appreciated that any number of stop devices may be provided, depending upon the size of the spacing section 19 and the number of pans which are to be spaced thereon, as will be hereinafter brought out.

The groups of pans 47 are conveyed onto the spacing section 19, and the lead group of pans is conveyed over the stop devices 69, 70 and 71 and along the spacing section until the lead pan of the group contacts the upper arms 75 of the device 72. This engagement of the stop devices causes the arms 75 to swing rearwardly until they contact a stop pin 107. This movement of the upper arms of the stop device causes the lower arm to swing forwardly and engage the rear end plate 85 of the tubular member 87. The tubular member 87 is thus moved forwardly, and the front end plate 91 engages the lower arm 75 of the adjacent stop device 71 and swings the latter forwardly until the upper arms 75 of the stop device 71 are disposed above the conveying surface of the conveyer plates 43 at substantially a 30° angle with respect to the vertical. The next group of pans will thus contact the upper arms of the stop device 71 and swing the same upwardly and rearwardly until they contact a stop pin 109. The lower arm 73 of each stop device 71 will thus move its adjacent tubular member 103 forwardly, so as to dispose the upper arms 75 of the stop device 70 in the path of movement of the oncoming groups of pans. The next group of pans will, therefore, contact the stop device 70 and move the same arms 75 thereof forwardly until the arms contact the stop pins 110. This movement of the stop device 70 will move the tubular members 105 forwardly, so as to cause the upper arms 75 of the stop device 69 to move into the path of movement of the oncoming pans; and the next group of pans will contact the upper arms of the stop device 69 and move the same rearwardly until they contact the stop pins 111. The lower arm 73 of the stop device 69 will thus be swung forwardly and will contact a spring-pressed electrical switch contact 113 for operating the pusher bar mechanism, hereinafter described.

As a safety feature of the aforementioned spacing mechanism means are provided for positively retaining the arms 75 of the stop devices in their raised and actuated position until the pans are moved off of the conveyor. Any suitable means may be provided, such as mechanical latches actuated by mechanical or electrical means, but the means illustrated includes electromagnets 112 which are connected to the conveyor frame so as to be engageable by magnetizable buttons 114 carried on the lugs 101, which are connected to the swingable tubular members disposed between the adjacent stop devices. The buttons 114 engage the magnets 112 when the lugs and stop device arms 75 are actuated by the oncoming pans.

The electromagnets 112 are connected in a D. C. circuit with a spring return normally open switch 116, which is supported on the conveyor frame so as to be engaged and closed by the first group of pans, which contact the stop devices 72. Thus when the buttons 114 engage the magnets 112 the arms 75 will be positively held in their fully actuated position and the pans will be properly spaced between the stop devices without any danger of misalignment or improper spacing of the same. It will, of course, be understood that the electromagnets 112 only retain the buttons 114 in engagement therewith upon contact and are not strong enough to move the buttons 114 into engagement therewith by magnetic action. When the pans are moved off of the conveyor by the pusher-bar mechanism, the switch 116 opens, under the action of its return spring, and the magnets 112 are de-energized, allowing the arms 75 of the stop devices to return to their initial positions.

The aforementioned spacing between the arresting finger 63 in the supply section 17 and the hinged plate 65 must be sufficient to space the groups of pans so that each group of pans which is conveyed into the spacing section 19 will separately engage one of the stop devices. The groups of pans, therefore, will be spaced on the spacing section in a predetermined relationship in accordance with the disposition and location of the stop devices 69, 70, 71 and 72. The last group of pans which contacts the stop device 69 will be stopped in such a position that one of the pans of the group will depress the hinged plate 65 and, therefore, maintain the arresting finger 63 in its raised position, so as to hold back any oncoming pans which are being carried along the supply section 17 until the groups of pans on the spacing section are moved away from the latter. When the pans are moved away from the spacing section, the hinged plate 65 is uncovered and the arresting finger 63 is moved to its lower position, so as to permit the pans in the supply section to again be conveyed into the spacing section.

Disposed between the conveyer spacing section 19 and the final proofer 21 is a pan pusher mechanism, illustrated in Figures 5, 6 and 7. The pan pusher mechanism may be of any of the well known constructions now conventionally used, but, for purposes of illustration, a chain-type pusher mechanism is provided. This mechanism includes a pair of side frame members 115 which extend outwardly from, and at substantially right angles to, the conveyer spacing section 19. Stub shafts 117 are journaled in the side frame members 115 adjacent the inner ends thereof, and a second pair of stub shafts 119 is journaled in the side frame members 115 adjacent the outer ends thereof. Chain sprockets 121 are keyed to each of the stub shafts 117 and 119. The stub shafts 119 have drive sprockets 123 keyed thereto which are connected by drive chains 125 to similar sprockets 127 keyed to a drive shaft 129 supported in the pusher mechanism frame. The shaft 129 is connected in any suitable manner, such as chain drive means (not shown), to a motor 131, illustrated in Figure 2.

A pair of single strand chains 130 is trained around the chain sprockets 121 of the shafts 117 and 119. A carriage 131 is pivotally connected to the links of the chain at 132 and the carriage is provided with two wheels 133, which, in turn, are supported on longitudinally extending tracks 134 supported by the pusher mechanism frame. It will be noted that the tracks 134 are spaced above the top of the pans 47, which are disposed on the conveyer chain of the spacing section 19, and are disposed below the chain 130 of the pusher mechanism. A transversely extending pusher bar 135 extends across the width of the proofer feed apron. Depending from the pusher bar 135 is a plurality of transversely spaced pusher fingers or plates 139 which are arranged so as to engage the top of the ends of the pans 47 and push the same laterally across the proofer feed apron. When the pans are fed into the conveyer spacing section 19, the pusher bar 135 is normally disposed rearwardly of the pans carried by the conveyer chain 41; and, when the last group of pans closes the aforementioned switch 113, the pusher mechanism motor 131 is started, so as to drive the chain 130 and cause the pusher bar 135 to move forwardly. When this occurs, the pusher bar fingers 139 engage the groups of pans 47 and move the same off of the conveyer chain 41 and onto the proofer feed apron 137. The pusher bar 135 pushes the pans 47 along the proofer feed apron until the pans reach a final proofer conveyer 141. The pans are thus disposed on the conveyer 141 of the final proofer 21 and are carried through the proofer in a properly spaced relationship, so that no damage, misalignment or wastage of space is occasioned. When the pusher bar reaches the sprockets on shaft 119, it travels around the same and the carriage 131 is returned to its starting position along track 143, disposed above the lower track 134. The pusher bar thus returns to its starting position above the pans 47, being conveyed into the conveyer spacing section 19, and is ready for the next operation. A suitable normally closed stop switch 151 is secured to the conveyer frame member 115 in position to be opened by a bracket 152 when the pusher is returned to its starting position, and is effective to break the circuit to the motor 131.

As shown diagrammatically in Figure 9, the motor 131 is connected between supply lines 152 and 153 by a line 154 containing the normally open contact 155 of a relay 156. The relay coil is connected between lines 152 and 153 by a line 157 containing the previously mentioned switch 113, which is a normally open switch that is closed only when the spacing section of the conveyer is filled with pans. Closure of switch 113 energizes the relay and thereby starts motor 131.

The relay 156 is provided with a second normally open contact 158 in a holding circuit 159, with the result that once switch 113 is closed the relay 156 remains energized even after switch 113 opens incident to feeding of the pans into the proofer. The holding circuit 159 contains the switch 151, which is closed at all times except when the pusher is in its starting position. As the result of this arrangement, motor 131 will be started by switch 113 and stopped by switch 151 when the pusher returns to starting position.

It will thus be seen that the feeding and spacing mechanism of this invention is desired to automatically handle the pans and convey the same from the panning machine 15 so that no misalignment, wastage of space or damage to the pans can occur during the entire feeding operation into the final proofer. The use of an unnecessary number of operators is also eliminated, and the pans are properly spaced and located in a predetermined relationship. It will, of course, be appreciated that the pans can be arranged in any suitable spaced arrangement and any predetermined number of pans may be carried by the pusher bar from the spacer section, so that the spacing section may be designed to hold any desired number of pans or other articles.

While only one form of the invention is illustrated and described, it will be apparent that variations in the details of construction may be indulged in without departing from the spirit of the invention or the scope of the appended claims. Thus, for example, while the preferred form of pan spacing mechanism employs mechanically actuated stop arms, it will be apparent that the same results may be achieved by substituting solenoids for the tubes 87, 103 and 105. In that case, each stop arm 75 would, when engaged and moved by a pan, close a circuit, which would energize a solenoid, which, in turn, would elevate the next preceding stop arm in the same manner as they are elevated by the tubes 87, 103 and 105.

What is claimed is:

1. Article feeding and spacing mechanism comprising, in combination, a conveyer for conveying articles along a predetermined path, a plurality of stop devices located along the path of movement of said conveyer and spaced from one another along said conveyer in accordance with the spacing desired between said articles, the endmost of said stop devices in the direction of movement of said conveyer being positioned to engage an article approaching it and the remainder of said stop devices being normally out of interfering relation with the movement of articles along said conveyer, means operatively connecting said stop devices so as to move the same successively into the path of movement of said articles after said endmost stop device and each successive stop device have been engaged by one of said articles whereby to releasably retain a predetermined number of said articles in a predetermined spaced relationship on said conveyer, conveyer means adapted to convey said articles away from said first conveyer means when said articles are in their predetermined spaced relation as determined by said stop devices, and means actuatable only when the last of said predetermined number of articles is in its predetermined spaced position for causing said second conveyer means to convey said articles out of the path of said first conveyer means, said means being released after said articles are conveyed away from said first conveyor means.

2. Article feeding and spacing mechanism comprising, in combination, a conveyer for conveying articles along a predetermined path, a plurality of stop devices located along the path of movement of said conveyer and spaced from one another along said conveyer in accordance with the spacing desired between said articles, the endmost of said stop devices in the direction of movement of said conveyer being positioned to engage an article approaching it and the remainder of said stop devices being normally out of interfering relation with the movement of articles along said conveyer, means operatively connecting said stop devices so as to move the same successively into the path of movement of said articles after said endmost stop device and each successive stop device has been engaged by one of said articles whereby to releasably retain a predetermined number of said articles in a predetermined spaced relationship on said conveyer, means disposed prior to said stop devices and actuatable by said articles for initially spacing the latter so as to separate the same a predetermined distance so that each of said predetermined number of articles will be engaged by only one of said stop devices, conveyer means adapted to convey said articles away from said first conveyer means when said articles are in their predetermined spaced relation as determined by said stop devices, and means actuatable as a result of the movement of the foremost of said stop devices for causing said second conveyer means to convey said articles out of the path of said first conveyer means.

3. Article feeding and spacing mechanism comprising, in combination, a conveyor for conveying articles along a predetermined path, a plurality of stop devices located along the path of movement of said conveyor and actuatable by said articles to releasably retain a predetermined number of said articles in a predetermined spaced relationship on said conveyor, stop means disposed prior to said stop devices and engageable with said articles for initially spacing the latter so as to separate the same a predetermined distance so that each of said predetermined number of articles will be engaged only by one of said stop devices, said stop means being normally out of interfering relationship with the articles conveyed along said path by said conveyor, actuator means operatively connected with said stop means and disposed in the path of movement of said articles between said stop means and foremost stop device, said actuator means being positioned with respect to said foremost stop device so that an article engaging said foremost stop device will engage said actuator means, which in turn will operate said stop means so as to releasably retain the articles disposed ahead of said stop devices until said predetermined number of articles is removed from engagement therewith, and conveyor means for conveying said articles away from said first conveyor means when said articles are in their predetermined spaced relationship as determined by said stop devices.

4. Article feeding and spacing mechanism comprising, in combination, a conveyor for conveying articles along a predetermined path, a plurality of stop devices located along the path of movement of said conveyor and actuatable by said articles to releasably retain a predetermined number of said articles in a predetermined spaced relationship on said conveyor, stop means disposed prior to said stop devices and engageable with said articles for initially spacing the latter so as to separate the same a predetermined distance so that each of said predetermined number of articles will be engaged only by one of said stop devices, said stop means being normally out of interfering relationship with the articles conveyed along said path by said conveyor, actuator means operatively connected with said stop means and disposed in the path of movement of said articles between said stop means and the foremost stop device, said actuator means being positioned with respect to said foremost stop device so that an article engaging said foremost stop device will engage said actuator means, which in turn will operate said stop means so as to releasably retain the articles disposed ahead of said stop devices until said predetermined number of articles is removed from engagement therewith, conveyor means for conveying said articles away from said first conveyor means when said articles are in their predetermined spaced relationship as determined by said stop devices, and means actuatable by the engagement of an article with said foremost stop device so as to cause the operation of said second conveyor means, whereby said articles will be conveyed out of the path of said first conveyor means.

5. Article feeding and spacing mechanism comprising, in combination, a conveyor for conveying articles along a predetermined path, a plurality of stop devices located along the path of movement of said conveyor and spaced from one another along said conveyor in accordance with the spacing desired between said articles, each of said stop devices including a generally upwardly extending article engaging arm portion and a generally downwardly extending actuating arm portion, means pivotally supporting each of said stop devices below the path of movement of said conveyor, the endmost of said stop devices in the direction of movement of said conveyor being positioned with the upper arm portion thereof disposed above the path of movement of said conveyor so as to be engageable by an article approaching it, and the remainder of said stop devices being positioned with the upper arm portion normally below and out of interfering relationship with the movement of articles along said conveyor, means disposed between each of said stop devices and operable by pivotal movement of each of said stop devices, caused by engagement of the stop device by one of said articles, so as to move the upper arm of said stop devices successively into the path of movement of said articles after the endmost stop device and each successive stop device has been engaged by one of said articles, whereby to releasably retain a predetermined number of said articles in a predetermined spaced relationship on said conveyor, stop means disposed prior to said stop devices for initially spacing the articles so as to separate the same a predetermined distance so that each of said predetermined number of articles will be engaged by only one of said stop devices, said stop means being positioned so as to normally be disposed out of the path of movement of said articles, actuator means operatively connected with said stop means and disposed in the path of movement of said articles between said stop means and the foremost of said stop devices, said actuator means being positioned so as to be engageable by an article engaging said foremost stop device and thereby actuating said stop means so as to cause the same to releasably retain article ahead of said stop devices until said predetermined number of articles is removed from engagement with said stop devices, conveyor means adapted to convey said predetermined number of articles away from said first conveyor means when said articles are in their predetermined spaced relation as determined by said stop devices, and means including an actuator element engageable by the actuator arm portion of said foremost stop device when the same is pivotally actuated by said means disposed between said foremost stop device and the adjacent stop device thereto, for causing operation of said conveyor means and the conveying of said articles out of the path of said first conveyor means, said actuator element being released after said articles are conveyed out of the path of said first conveyor means.

6. Article feeding and spacing mechanism comprising, in combination, a conveyer for conveying articles along a predetermined path, a plurality of stop devices located along the path of movement of said conveyer and spaced from one another along said conveyer in accordance with the spacing desired between said articles, the endmost of said stop devices in the direction of movement of said conveyer being positioned to engage an article approaching it and the remainder of said stop devices being normally out of interfering relation with the movement of articles along said conveyer, said endmost stop being mounted for limited movement in response to engagement by an article on said conveyer, the stop next adjacent said endmost stop being a unitary lever mounted on a fixed pivot and having its upper end swingable from a position beneath the path of movement of articles on said conveyer through an arc of movement, means operable in response to movement of said endmost stop by an article on the conveyer for swinging said next stop through a first portion of said arc into a position in which the upper end thereof is engageable by the next article on the conveyer for movement through the remainder of said arc, a third stop spaced from said next stop, said third stop being a unitary pivoted lever having its upper end swingable from a position beneath the path of movement of the articles on said conveyer to a position in said path, and means operable in response to movement of said next stop through the remainder of said arc by an article on said conveyer for swinging said third stop into the path of movement of articles on said conveyer.

7. Article feeding and spacing mechanism comprising, in combination, a conveyer for conveying articles along a predetermined path, a plurality of stop devices located along the path of movement of said conveyer and spaced from one another along said conveyer in accordance with the spacing desired between said articles, the endmost of said stop devices in the direction of movement of said conveyer being positioned to engage an article approaching it and the remainder of said stop devices being normally out of interfering relation with the movement of articles along said conveyer, said endmost stop being a pivoted lever having an upper arm in the path of movement of the articles on the conveyer and a lower arm, and being capable of limited pivotal movement in response to engagement by an article on said conveyer, the stop next adjacent said endmost stop being a unitary lever mounted on a fixed pivot and having its upper end swingable from a position beneath the path of movement of articles on said conveyer through an arc of movement, a first portion of which movement will position said upper end for engagement by the next article on the conveyer, said lever having a lower arm weighted to hang by gravity in a position in which the upper end of the lever is beneath the path of movement of articles on the conveyer, a third stop in the form of a unitary lever mounted on a fixed pivot and having an upper arm swingable from a position beneath the path of movement of articles on said conveyer into a position in said path of movement, said third stop lever having a lower arm weighted to hang by gravity in a position in which the upper arm of the lever is beneath the path of movement of articles on the conveyer, a first push rod extending between and in position to engage the lower arms of the endmost stop lever and said next stop lever and of a length approximately equal to the distance between the point on said lower arms engaged by said push rod when neither stop lever is engaged by an article on the conveyer, and a second push rod extending between and in position to engage the lower arms of said next stop lever and said third stop lever and being of a length approximately equal to the distance between the points on said arms engaged by said push rods when the third stop lever is in its position beneath the path of movement of articles on the conveyer and said next stop lever is in the first position of said arc, whereby movement of said next stop lever through said arc by an article on the conveyer will move said third stop lever into a position in which its upper arm lies in the path of movement of articles on said conveyer.

8. Article feeding and spacing mechanism comprising, in combination, a conveyer for conveying articles along a predetermined path, a plurality of stop devices located along the path of movement of said conveyer and spaced from one another along said conveyer in accordance with the spacing desired between said articles, the endmost of said stop devices in the direction of movement of said conveyer being positioned to engage an article approaching it and the remainder of said stop devices being normally out of interfering relation with the movement of articles along said conveyer, said endmost stop being a pivoted lever having an upper arm in the path of movement of the articles on the conveyer and a lower arm, and being capable of limited pivotal movement in response to engagement by an article on said conveyer, the stop next adjacent said endmost stop being a unitary lever mounted on a fixed pivot and having its upper end swingable from a position beneath the path of movement of articles on said conveyer through an arc of movement, a first portion of which movement will position said upper end for engagement by the next article on the conveyer, said lever having a lower arm weighted to hang by gravity in a position in which the upper end of the lever is beneath the path of movement of articles on the conveyer, a third stop in the form of a unitary lever mounted on a fixed pivot and having an upper arm swingable from a position beneath the path of movement of articles on said conveyer into a position in said path of movement, said third stop lever having a lower arm weighted to hang by gravity in a position in which the upper arm of the lever is beneath the path of movement of articles on the conveyer, a first push rod extending between and in position to engage the lower arms of the endmost stop lever and said next stop lever and of a length approximately equal to the distance between the points on said lower arms engaged by said push rod when neither stop lever is engaged by an article on the conveyer, a second push rod extending between and in position to engage the lower arms of said next stop lever and said third stop lever and being of a length approximately equal to the distance between the points on said arms engaged by said push rods when the third stop lever is in its position beneath the path of movement of articles on the conveyer and said next stop lever is in the first position of said arc, whereby movement of said next stop lever through said arc by an article on the conveyer will move said third stop lever into a position in which its upper arm lies in the path of movement of articles on said conveyer, and magnetic means for releasably retaining each of said stop levers in its fully swung position caused by actuation by the articles on said conveyer.

EZRA F. SPERLING.

REFERENCES CITED

The following references are of record in the file of this patent:

UNITED STATES PATENTS

| Number | Name | Date |
|---|---|---|
| 1,469,329 | Olson | Oct. 2, 1923 |
| 1,490,076 | Luce | Apr. 8, 1924 |
| 1,819,032 | Lehman | Aug. 18, 1931 |
| 1,832,343 | Wittman | Nov. 17, 1931 |
| 1,904,613 | Braren | Apr. 18, 1933 |